United States Patent [19]

Abe et al.

[11] 4,174,783

[45] Nov. 20, 1979

[54] HOLLOW BOTTLE AND PRODUCTION METHOD THEREFOR

[75] Inventors: Takashi Abe, Koganei; Kazuo Kudo, Tokyo; Keiji Kazato, Chiba, all of Japan

[73] Assignee: Toppan Printing Co., Ltd., Tokyo, Japan

[21] Appl. No.: 909,007

[22] Filed: May 24, 1978

[30] Foreign Application Priority Data

Sep. 30, 1977 [JP] Japan .............................. 52/117735

[51] Int. Cl.² .............................................. B65D 23/00
[52] U.S. Cl. ...................................................... 215/1 C
[58] Field of Search ................. 215/1 C; 220/66, 453, 220/468

[56] References Cited

U.S. PATENT DOCUMENTS

| | | | |
|---|---|---|---|
| 3,093,255 | 6/1963 | Mesrobian | 215/1 C |
| 3,561,629 | 2/1971 | Turner | 215/1 C |

FOREIGN PATENT DOCUMENTS 1361504  4/1964  France ...................................... 215/1 C

*Primary Examiner*—Donald F. Norton
*Attorney, Agent, or Firm*—Weingarten, Maxham & Schurgin

[57] ABSTRACT

A hollow bottle and the production method therefor. The hollow bottle of the invention is of multi-layer structure and has excellent chemical resistance and large fused adhesion strength in the pinch-off portion of the bottom. The inner layer of the bottle is made of polyamide resin and the depth of the joint groove formed in the inside surface of the inner layer in the pinch-off portion is 20% in depth as compared with the length of the pich-off portion, which portion is in a cross-sectionally tapered-off projection formed on the bottom of the bottle.

In the production method of the present invention, after the multi-layer parison is extruded from dies, the lowermost end of the parison is closed and an inert gas is then blown into the parison, or the bottom of the parison is closed with blowing the inert gas. After the bottom of the parison is closed, it is transferred into a blow mold and blow molding is carried out, thereby forming a hollow bottle of the present invention.

8 Claims, 10 Drawing Figures

FIG.2
FIG.1
Prior Art
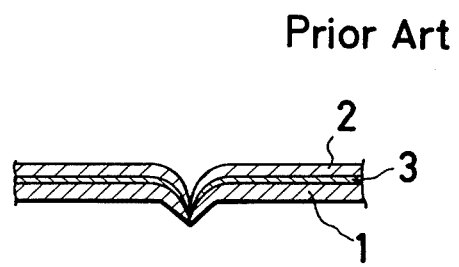
FIG.3
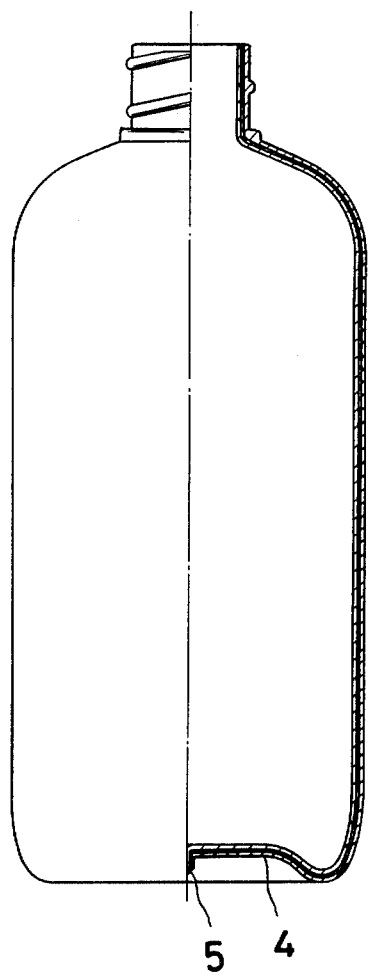
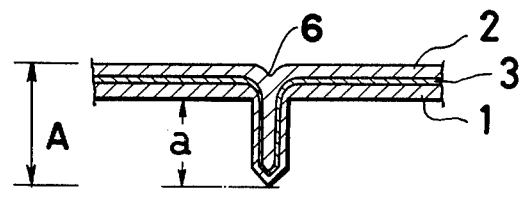

HOLLOW BOTTLE AND PRODUCTION METHOD THEREFOR

BACKGROUND OF THE INVENTION

This invention relates to a hollow bottle having good chemical resistance and excellent fused adhesion strength of the bottom, and the production method therefor. More particularly, the invention relates to a multi-layered bottle which is made by using polyamide resin and the fused adhesion strength of the bottom pinch-off portion of which is quite large as compared with the conventional similar ones.

In the prior art, polyethylene and polypropylene are generally used for producing blow molded bottles, however, they are unsatisfactory in view of the chemical resistance. So that, when the bottles are filled with agricultural medicines and industrial chemicals, the bottles are swollen or, after the passage of a certain time, cracks are caused to occur, therefore, such bottles cannot be used widely in view of the safety. In order to improve the chemical resistance, the use of the resin having good resistance to organic chemicals such as nylon has been proposed.

Thus, the production of single layer bottles made of nylon has been undertaken, however, it has been difficult to produce the nylon bottles because the drawdown phenomenon is caused to occur owing to the low molten viscosity of nylon during the molding operation. Further, the fused adhesion strength of the pinch-off portion in the bottom of nylon single layer bottle is very low so that, if the bottle is dropped, the pinch-off portion is easily separated. Due to the above facts, nylon bottles are not used as the containers for agricultural medicines and industrial chemicals, which are generally filled in metallic cans or glass bottles. It has, however, become a social problem that the wastes of metallic cans and glass bottles after the use thereof are difficulty disposed of. Therefore, the proposal of chemically resistant container has long been desired in place of the above bottles.

As the method for obtaining such improved bottles, for example as shown in Japanese Patent Laid-Open Publication No. Sho. 50-75019 (1975), it is proposed that a double-layer bottle is made of an outer layer of polyolefin containing much inorganic substance such as calcium carbonate and an inner layer of nylon. In the double-layer bottle having such layer structure, however, the fused adhesion strength of the bottom pinch-off portion has not been improved yet.

The fused adhesion strength of the bottom pinch-off portion has a close relationship to the strength in drop test. So that, if the fused adhesion strength of the pinch-off portion is lower than a certain lever, the bottom pinch-off portion is liable to split when the bottle is dropped and it cannot be used safely.

Since the polyolefins such as polyethylene and polypropylene are thermally adhesive, the adhesion strength of the pinch-off portion of the bottle which is made by the conventional blow molding method by using the polyolefin, is satisfactory. While, in the case of nylon, oxide film is formed on the surface because the nylon is liable to receive the influence of oxygen in the air, so that, even through the pinch-off portion looks like to be joined together, the fused adhesion strength of the pinch-off portion is not large enough.

Further, when nylon is used as an inner layer material and a multi-layer parison is inserted into a blow mold and the blow molding is performed by closing the mold, the joined portion is pulled apart and a V-shaped groove is formed in the joined pinch-off portion because a compressed fluid is introduced in the parison during the blow molding and the fused adhesion strength of the inner nylon layer in the pinch-off portion is not satisfactory. Therefore, the area of fused adhesion in pinch-off portion becomes narrow and the fused adhesion strength of the bottom pinch-off portion is largely reduced.

BRIEF SUMMARY OF THE INVENTION

Taking the above-described disadvantages in the conventional art, the inventor of the present invention has carried out wide and extensive studies on the development of a new and improved container and the production method therefor. As a result, the present invention has been accomplished.

It is, therefore, the primary object of the present invention to provide a novel hollow bottle which has a good chemical resistance and excellent fused adhesion strength in the bottom pinch-off portion.

Another object of the present invention is to provide a hollow bottle which is easy in waste disposal after the contents are used up.

A further object of the present invention is to provide an improved method for producing the above hollow bottle of the invention.

In accordance with the present invention, the parison for forming a multi-layer bottle is produced by co-extrusion method. The outer layer of the parison is made of a polyolefin material containing an incombustible inorganic filler, the intermediate layer is made of a modified polyolefin obtained by graft-modifying with an unsaturated carboxylic acid or its derivative, ethylene-vinyl acetate copolymer or ethylene-ethylacrylate copolymer, and the inner layer is made of polyamide resin.

The groove formed in the inside surface of the pinch-off portion of this multi-layer vessel is shallow and the cross-sectional shape of the pinch-off portion on the outside is tapered off. In the production process, the lowest end of the parison which is extruded from dies, is closed and an inert gas is then blown into the parison, or the lowest end is closed while supplying the inert gas to the parison. Therefore, the blow molding can be carried out without the oxidation of the surface of the polyamide inner layer.

BRIEF DESCRIPTION OF THE DRAWINGS

These and other objects and features of the invention will become more apparent from the following description taken in connection with the accompanying drawings in which:

FIG. 1 is an enlarged cross-sectional view of the pinch-off portion of a bottle which is made according to the conventional method;

FIG. 2 is a partially cross-sectional view of an embodiment of the hollow bottle of the present invention;

FIG. 3 is an enlarged cross-sectional view of the pinch-off portion of the hollow bottle of the present invention as shown in FIG. 2;

FIG. 4 to FIG. 8 illustrate the process of the production method of the present invention, in which FIG. 4 is a schematic illustration of the step for parison cutting from a preceding parison;

FIG. 5 is a schematic illustration of the step for parison sealing;

FIG. 6 is a schematic illustration of the step for the insertion of the parison into a blow mold;

FIG. 7 is a schematic illustration of the step for parison cutting from the die; and FIG. 8 is a schematic illustration of the step for compressed fluid blowing into the parison held in the blow mold;

DETAILED DESCRIPTION OF THE INVENTION

Figure 4:
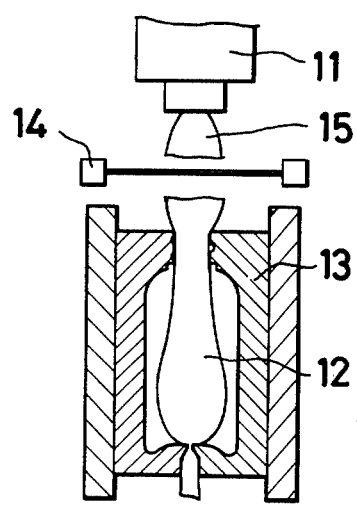

As shown in FIGS. 2 and 3, an embodiment of the hollow bottle according to the present invention is composed of an outer layer, an intermediate layer and an inner layer which are formed by co-extrusion method. As described above, this hollow bottle is excellent in chemical resistance and in fused adhesion strength, and is easy in waste disposal.

The outer layer 1 consists of a polyolefin such as polyethylene as a main component and 5 to 50% by weight of incombustible inorganic materials such as calcium carbonate and talc. In order to improve the compatibility between the polyolefin and the incombustible inorganic materials, it is advisable to add 1 to 10% by weight of nylon to the mixture. Exemplified as the incombustible inorganic materials besides the above two are calcium sulfite, kaolin clay, magnesium carbonate, magnesium hydroxide, aluminium hydroxide, basic magnesium carbonate, precipitated barium carbonate, and gypsum. The particle size of these incombustible inorganic material may be in the ordinary values as the fillers for plastics, such as 0.5 to 50 microns.

As the polyolefins, there are exemplified by low density polyethylene, high density polyethylene, polypropylene, ethylene-polypropylene copolymer, and the mixture of polypropylene with 5 to 30% by weight of ethylene-polypropylene copolymer or ethylene-ethylacrylate copolymer. In the mixed resin of polypropylene, the advantage of the stiffness of polypropylene can be taken.

The resins for the intermediate layer 3 may be those having good adhesive property to both the outer layer 1 and the inner layer 2. Exemplified as such resins are ethylene-ethlacrylate copolymer, ethylene-vinyl acetate copolymer, ionomer resin, modified polyolefin which is made by graft-modifying with an unsaturated carboxylic acid or its derivative, and the mixture of two or more of the above resins. The above-mentioned graft-modified polyolefin obtained by using unsaturated carboxylic acid or its derivative will be described further in the following.

Specific examples of the monomers to be grafted to the polyolefin (hereinafter referred to as a "grafted monomer") include ethylenically unsaturated carboxylic acid such as acrylic acid, methacrylic acid, fumaric acid and itaconic acid, acid anhydrides such as maleic anhydride, acrylic anhydride and methacrylic anhydride, itaconic acrylate, butyl acrylate, amides such as maleic acid monoamide, maleic acid diamide, maleic acid-N-monoethylamide and maleic acid-N,N-diethylamide, imides such as maleimide, N-butyl maleimide and N-phenyl maleimide and metallic salts such as sodium acrylate and potassium methacrylate. Of these, maleic anhydride and acrylic acid are preferred.

The grafting of unsaturated carboxylic acid or a derivative thereof to polyolefin is known. For example, there can be quoted a process the graft monomer and a catalyst are mixed with each other, and then the mixture is homogeneously melted. There is another method which involve the addition of a graft monomer and a catalyst to a polyolefin suspended or dissolved in a suitable solvent. In the present invention the grafted polyolefins to be used may be prepared by any method.

The quantity of the grafted monomer to the polyolefin is within the range of $10^{-4}$ to 3% by weight, which range is desirable for maintaining the adhesive property to other resins and to the essential property of the polyolefin itself.

Further, the inner layer 2 consists of a polyamide resin such as nylon-6, nylon-6,10, nylon-6,6, nylon-8 or nylon-12.

The ratio by weight of the outer layer, intermediate layer and inner layer may be in the range of 20–90:0-.5–50:0.5–40, which range is desirable in view of the incineration of the bottles after the use. Further, since the polyolefin of the outer layer 1 contains incombustible inorganic materials, the cost for the production of the hollow bottles can be reduced, in addition, the thermal conductivity thereof is better as compared with the ordinary polyolefins so that the cooling time can be shortened and the dimensional stability of the obtained bottle can be improved.

In the hollow bottle of the present invention, the outside of the pinch-off portion 5 of the bottom 4 is tapered off to the tip end and the depth of the groove 6 formed in the inner surface of the inner layer 2 is not more than 20% as compared with the length A of the pinch-off portion 5 so that the area of the fused adhesion is large. As shown in FIG. 3, the symbol a indicates the length of the downward protrusion of the pinch-off portion 5 from the bottom surface of the bottle. The above length A of the pinch-off portion 5 is the sum of the above dimension a and the thickness of the bottom 4. Further, in this pinch-off portion, the thickness of each layer in the joined portion is substantially the same as the corresponding layer in the body portion, which is quite different from the pinch-off portion in the conventional art. Therefore, the fused adhesion strength of the pinch-off portion is very large which is different from the conventional multi-layer bottle which has weak pinch-off portion as shown in FIG. 1.

The production method of the present invention will be described in the following.

In the production method of the present invention, it is characterized that a parison is subjected to blow molding with blowing an inert gas such as nitrogen gas into the parison to be treated in order to avoid the lowering of fused adhesion strength owing to the formation of oxide film on the surface of the inner layer.

Figure 6:
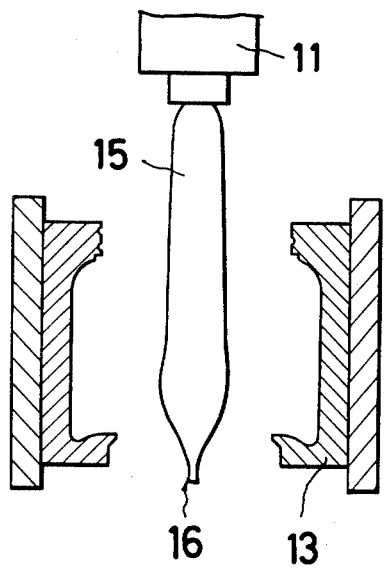
Figure 5:
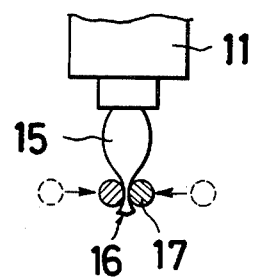
Figure 7:
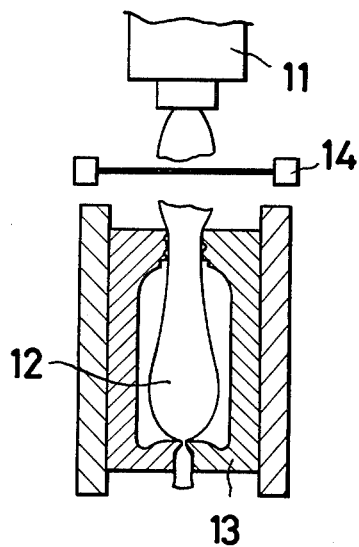
Figure 8:
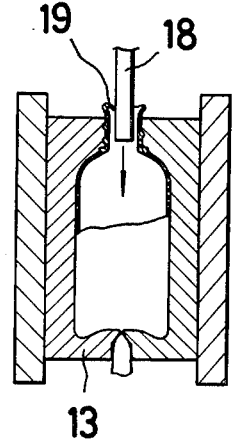
Figure 9:
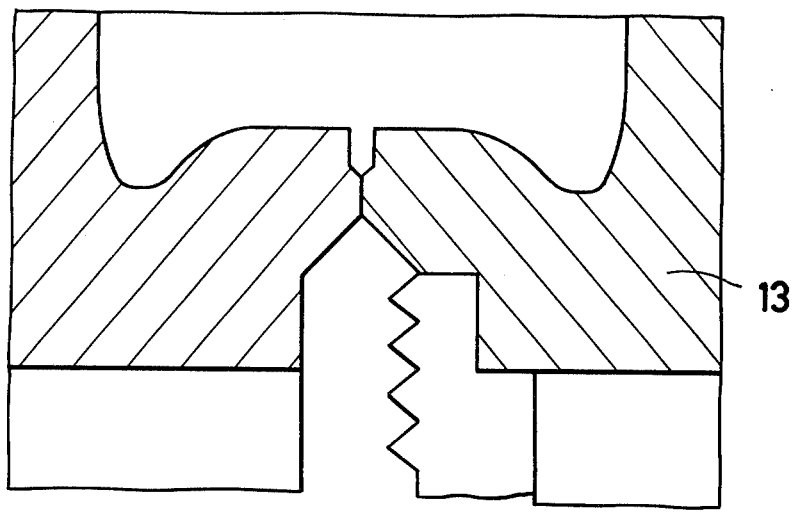
FIG. 9 is an enlarged cross-sectional view of the bottom portion of the blow mold which is used for the method of the present invention.
Figure 10:
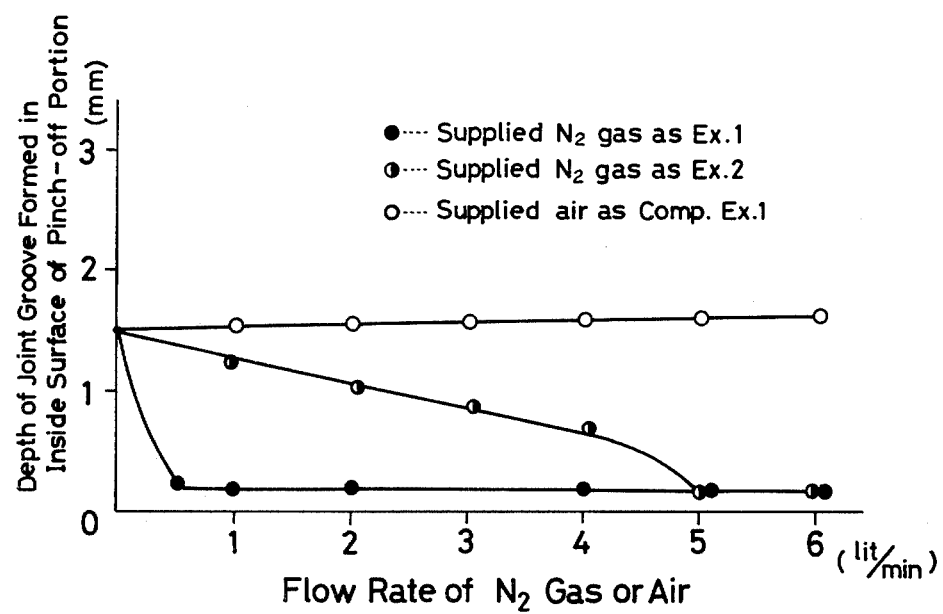
FIG. 10 is a graphic chart showing the relation between the depth of the joint groove formed in the inside surface of the inner layer in the pinch-off portion of the hollow bottle of the present invention and the rate of supply of nitrogen gas or air in the blow molding.

As shown in FIG. 4, the parison 12 that has been extruded from a die head 11 is introduced into a blow mold 13. When the parison 12 is received within the mold 13, it is cut at a predetermined length by a parison cutter 14. Then, as shown in FIG. 5, the lower cut end 16 of another parison 15 is immediately closed by a parison sealer 17. As shown in FIG. 6, the parison 15 is temporarily supplied with nitrogen gas and it is maintained until it becomes a certain length. The parison 15 of a certain length is then transferred into a blow mold 13 as shown in FIG. 7 and the upper end of the parison 15 is cut off by the parison cutter 14 to obtain a cut parison of a certain length. Then, as shown in FIG. 8, a blowing nozzle 18 is inserted into the opening 19 of the parison 15 and a hollow vessel is formed by the supply of compressed air. In the above-mentioned supply of nitrogen gas, the bottom end of the parison can be closed not only before the supply of nitrogen gas but also during the supply of the nitrogen gas when the parison is elongated to a predetermined length.

The necessary quantities of the nitrogen gas to obtain complete fused adhesion strength of the bottom pinch-off portions in the present invention are such that, when the nitrogen gas is supplied after the sealing of the bottom end, the flow rate of the gas is 0.5 lit/min or more, and when the bottom end is sealed with the supply of the nitrogen gas, the flow rate of the gas is 5 lit/min or more. The time of the blowing of nitrogen gas for several seconds is quite enough. According to the above-described production method, the depth of the groove formed in the inside surface of the pinch-off portion becomes 20% or less as compared with the length of the pinch-off portion so that the fused adhesion strength of the pinch-off portion can be made satisfactory. In this pinch-off portion, the thickness of each layer in the joined portion is substantially the same as the corresponding layer in the body portion of the bottle, which is quite different from the pinch-off portion in the conventional art. In this molding method, the bottom of the bottle is provided with the tapered-off projection or ridge on its outer surface so that the fused adhesion strength of the pinch-off portion can be much improved. Further, in FIG. 3, the dimension a is determined such that the lower end portion of the above ridge on the outer surface of the bottom does not exceed the lowest edge portion of the bottom of the bottle.

As described above, the bottle of the present invention is quite excellent as a bottle for receiving various chemicals since the polyamide layer is used as the inner layer, in addition, the fused adhesion strength of the pinch-off portion of the bottle is quite good. Further, the incineration of the waste bottles of the present invention is made quite easy in view of the social problem of waste disposal.

In the following, some examples of the present invention will be described.

EXAMPLE 1

High density polyethylene (M.I.=0.3) containing 40% by weight of calcium carbonate (particle diameter=1.5 microns) was fed into an extruder for forming the outer layer. Modified high density polyethylene which was grafted with maleic acid, was fed into another extruder for the intermediate layer, while, the extruder for the inner layer was fed with 6-nylon (relative viscosity: $\eta_{red}$=4.5). The above materials were extruded from the respective extruders and fed into concentric triple-layered dies. The layers of the materials were fused together within the dies and an apparently single piece of parison was extruded. After the parison was extruded from the dies for about 50 mm, the lowest end portion of the parison was sealed up by a parison sealer. After the sealing, nitrogen gas was blown into the sealed parison for about 1 second at a rate of 0.5 lit/min.

When the parison was elongated to the length of a blow mold by this nitrogen gas blowing, the upper portion of the parison was cut off and compressed air was blown into the parison from a nozzle, thereby forming a hollow bottle. The volume of this bottle was 500 ml and the thickness of the outer layer was 0.20 mm, the intermediate layer, 0.05 mm, and the inner layer, 0.60 mm. The depth of the joint groove formed in the inside surface of the inner layer of the pinch-off portion, the fused adhesion strength of the pinch-off portion, the result of drop test and other properties are shown in the following Table 1.

EXAMPLE 2

A parison having the same layer structure as that of Example 1 was extruded from the dies in which, during the extrusion of the parison from the dies, nitrogen gas was continuously blown at a rate of more than 5 to 6 lit/min. Then the lowermost end of the parison was sealed up and blow molding was carried out in like manner as Example 1 to obtain a hollow bottle of 500 ml volume. The properties of this bottle are also shown in the following Table 1.

COMPARATIVE EXAMPLE 1

A parison having the same layer structure as that of Example 1 was extruded from the dies. During the extrusion of the parison from the dies, air was continuously blown at a rate of about 5 lit/min. Then the parison was subjected to blow molding in like manner as Example 1 to obtain a hollow bottles of 500 ml volume. The properties of this bottle are shown in the following Table 1.

COMPARATIVE EXAMPLE 2

A parison having the same layer structure as that of Example 1 was extruded from the dies. During the extrusion of the parison from the dies, air was continuously blown at a rate of about 5 lit/min. The pinch-off portion was formed in the conventional type of the cross-sectionally V-shaped configuration. Then a 500 ml volume hollow bottle was obtained by blow molding. Several properties of this bottle are also shown in the following Table 1.

COMPARATIVE EXAMPLE 3

By using low density polyethylene (M.I.=0.3 g/min, d=0.920 g/cm³), a conventional hollow bottle of 500 ml in volume was produced. The properties of this bottle are shown in the following Table 1.

Table 1

| | Properties of Obtained Bottles | | | | |
|---|---|---|---|---|---|
| | Ex. 1 | Ex. 2 | Comp. Ex. 1 | Comp. Ex. 2 | Comp. Ex. 3 |
| Depth of joint groove formed in inside surface of inner layer of pinch-off portion(mm) | 0 | 0 | 1.5 | 2.5 | — |
| Fused adhesion strength (kg/15mm) | 30 | 30 | 5 | 1 | — |
| Strength in drop test(*) | 10/10 | 10/10 | 0/10 | 0/10 | — |
| Combustion calorie (cal/g) | 6100 | 6100 | 6100 | 6100 | 12000 |
| Chemical |

Table 1-continued

| | Properties of Obtained Bottles | | | | |
|---|---|---|---|---|---|
| | Ex. 1 | Ex. 2 | Comp. Ex. 1 | Comp. Ex. 2 | Comp. Ex. 3 |
| resistance | | | | | |
| Benzene | O | O | O | O | X |
| Toluene | O | O | O | O | X |
| Xylene | O | O | O | O | X |
| Acetone | O | O | O | O | X |
| Petroleum | O | O | O | O | Δ - X |
| Benzine | O | O | O | O | Δ - X |

Note for Table 1.
Strength in drop test(*):
Ten hollow vessels were dropped 10 times each from the height of 1 m and the results were represented by the number of the bottles which were not broken in such tests.
Chemical resistance:
O : Stable. No substantial increase in weight and volume.
Δ : Unstable. Partly usable in certain conditions.
X : Not good. Seriously eroded in a short time.

From the above-described test results, it will be understood that the hollow bottles of the present invention are quite excellent in several properties as compared with the conventional ones.

Although the present invention has been described in connection with preferred embodiments thereof, many variations and modifications will now become apparent to those skilled in art. It is preferred, therefore, that the present invention be limited not by the specific disclosure herein, but only by the appended claims.

What is claimed is:

1. A unitary multi-layer hollow bottle comprising:
an inner layer of polyamide resin;
an outer layer of polyolefin combined with an incombustible inorganic material; and
an intermediate layer of resin adherent to both said inner and outer layers;
said bottle being formed with a pinch-off portion at the bottom, said inner, outer and intermediate layers being substantially continuous throughout the outwardly projecting length of said pinch-off portion.

2. The hollow bottle as claimed in claim 1, wherein the thickness of each layer in said pinch-off portion is substantially the same as the corresponding layer in the body portion of said hollow bottle.

3. The hollow bottle as claimed in 1, wherein said outer layer is made of polyolefin containing 5 to 50% by weight of an incombustible inorganic material.

4. The hollow bottle as claimed in claim 1, wherein said intermediate layer is made of at least one member selected from the group consisting of ethylene-acrylic acid copolymer, ethylene-vinyl acetate copolymer, ionomer resin, and modified polyolefin which is made by modifying with an unsaturated carboxylic acid or its derivative.

5. The hollow bottle as claimed in claim 1, wherein the weight ratio of said outer layer, intermediate layer and inner layer is 20–90:0.5–50:0.5–40.

6. The hollow bottle as claimed in claim 1, wherein 1 to 10% by weight of polyamide resin is added to the polyolefin of said outer layer in addition to said incombustible inorganic material.

7. The hollow bottle recited in claim 1 wherein said inner layer normally is formed with a groove coincident with said pinch-off portion, the depth of said groove being not more than 20% of said outwardly projecting length of said pinch-off portion.

8. The hollow bottle recited in claim 7 wherein the outer end of said pinch-off portion is tapered.

* * * * *

UNITED STATES PATENT AND TRADEMARK OFFICE
CERTIFICATE OF CORRECTION

PATENT NO. : 4,174,783
DATED : November 20, 1979
INVENTOR(S) : Takashi Abe et al It is certified that error appears in the above-identified patent and that said Letters Patent are hereby corrected as shown below:

In the Abstract, line 9, "pich-off" should read --pinch-off--.
Column 1, line 44, "Sho. 50-75019" should read --Sho. 50-74019--.
Column 3, line 53, "ethlacrylate" should read --ethylacrylate--.
Column 5, line 36, "dimension a is" should read --dimension $\underline{a}$ is--.

Signed and Sealed this

Eighteenth Day of March 1980

[SEAL]

Attest:

SIDNEY A. DIAMOND

Attesting Officer

Commissioner of Patents and Trademarks